UNITED STATES PATENT OFFICE.

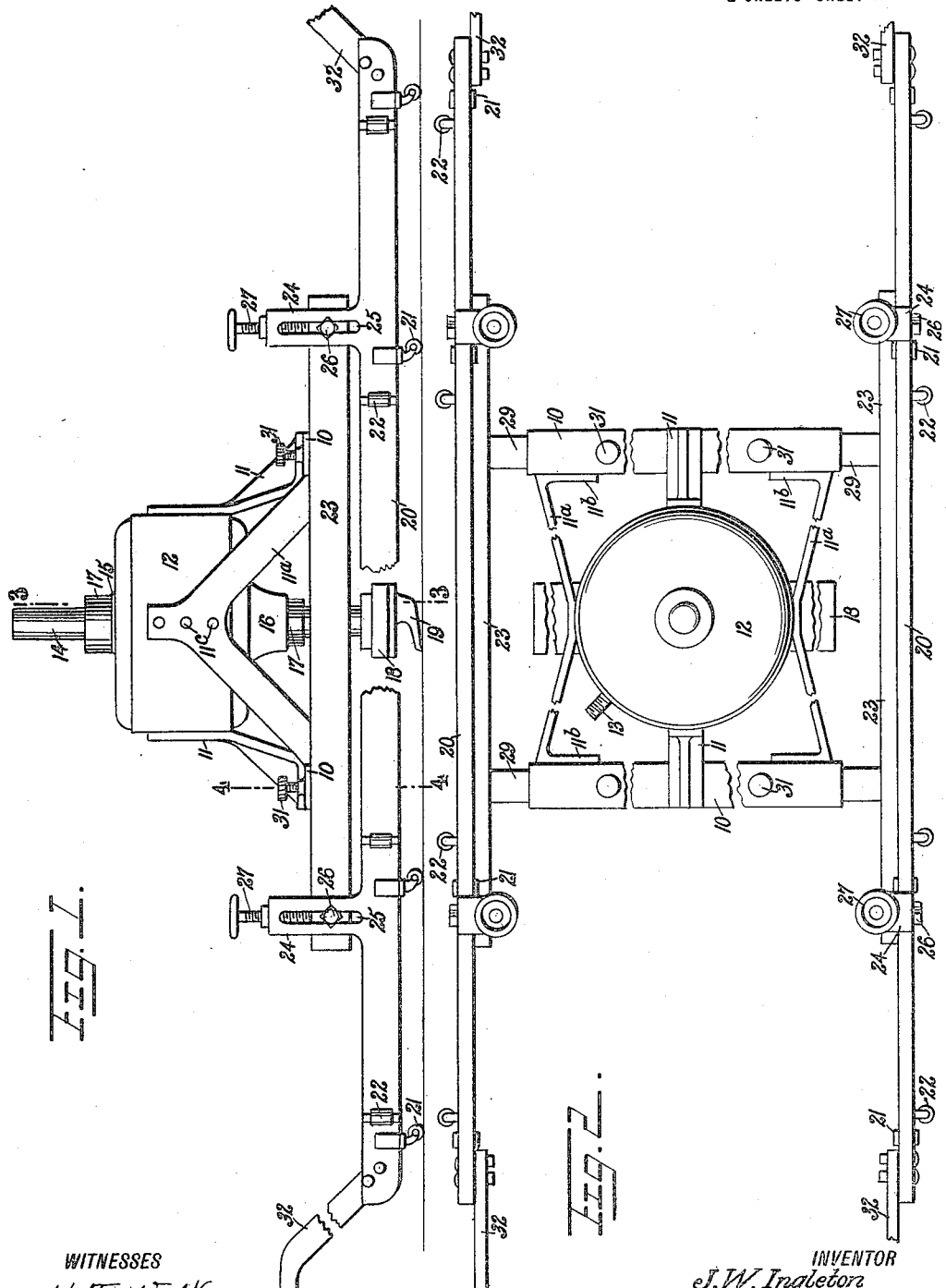

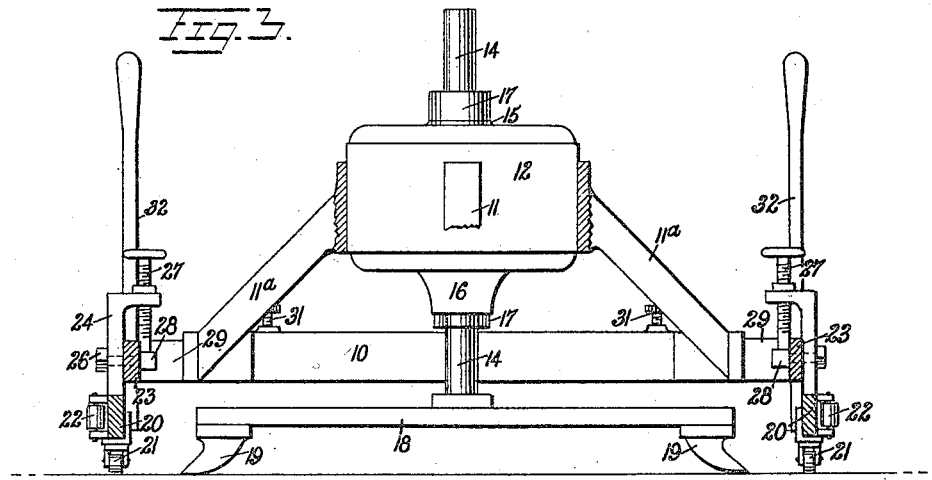
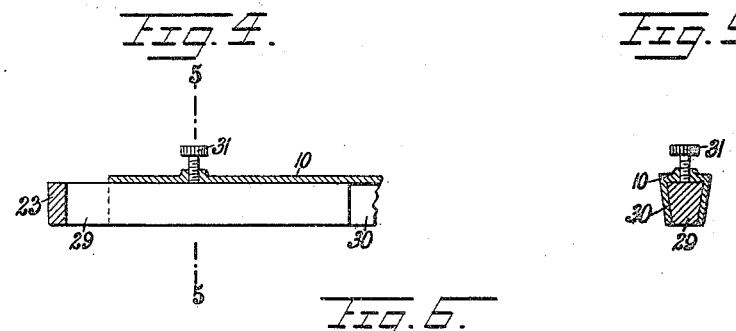
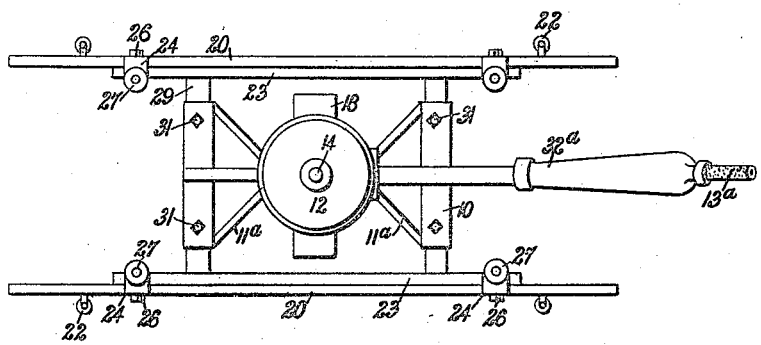

JAMES W. INGLETON, OF ASTORIA, OREGON.

DUBBING-MACHINE.

1,259,404.   Specification of Letters Patent.   Patented Mar. 12, 1918.

Application filed October 18, 1917. Serial No. 197,276.

*To all whom it may concern:*

Be it known that I, JAMES W. INGLETON, a citizen of the United States, and a resident of Astoria, in the county of Clatsop and State of Oregon, have invented a new and Improved Dubbing-Machine, of which the following is a full, clear, and exact description.

My invention is more particularly intended to be embodied in a machine for use in building wooden ships to dub off or plane the ribs of the ship on the outside to receive the planking and on the inside for the ceiling.

Objects of the invention are to provide a practical machine to perform the dubbing operation; to provide a machine having a power-driven cutter head and side runners to sustain and guide the machine and adjustable relatively to the plane of rotation of the cutters to regulate the depth of the cut; to provide for the ready lateral adjustment of frame parts carrying the runners, whereby to vary the distance between the runners; and to provide a machine for the indicated purpose that may be conveniently adjusted and operated.

Reference is to be had to the accompanying drawings.

Figure 1 is a side elevation of a dubbing machine embodying my invention, part being broken away;

Fig. 2 is a broken plan view thereof;

Fig. 3 is a transverse vertical section on the line 3—3, Fig. 1;

Fig. 4 is a detail in transverse vertical section on the line 4—4, Fig. 1;

Fig. 5 is a cross section on the line 5—5, Fig. 4;

Fig. 6 is a plan view indicating a slightly different form of the machine designed to be operated by one man.

In carrying out my invention suitable frame members 10 are provided and here shown as consisting of side bars. The frame members support the stator of a rotary motor designated generally by the numeral 12. An air driven turbine is conventionally indicated in the present instance, the numeral 13 indicating the inlet nipple for connection of the air pipe (not shown). The motor in the example shown is secured by brackets 11 at two sides, said brackets extending directly from the frame members 10 to the motor and suitably secured to both. Additional brackets 11$^a$ at the remaining two sides are employed, the brackets extending between the frame bars 10 and suitably secured as at 11$^c$ (Fig. 1) to the stator, said brackets having flanges 11$^b$, suitably secured to the frame bars.

The motor shaft 14 turns in suitable bearings 15, 16 at opposite sides of the stator and on the forward end of the shaft (here shown as the lower end) a cross bar 18 is provided, said bar carrying cutters 19 adapted to plane off the surface by the rotation of the shaft 14.

The depth of the cut is regulated by the provision of adjustable runners 20, there being a runner at each side of the machine. Wheels or rollers 21 are provided on the under side of the runners and also on the outer side of each runner suitable guard rollers 22 are mounted on axes at right angles to the rollers 21 to take a bearing against any lateral objects or surfaces adjacent to which the machine is being used. The runners 20 are vertically adjustable on side bars 23 of the machine frame for which purpose said runners are provided with brackets 24 having slots 25 that receive set screws 26 to engage the side bars 23. Adjusting screws 27 have threaded engagement with the brackets 24 and engage projections 28 on the bars 23 so that the turning of the screws will adjust the runners 20 relatively to the said frame bars 23, to thereby adjust the runners relatively to the plane of rotation of the cutters 19. In practice, for planing the sides of a ship's frame the carpenter first planes streaks about four inches wide and about thirty-six inches apart running the whole length of the ship, the runners being guided on the surfaces thus planed.

In order to vary the distance between the runners 20 the side frame bars 23 are laterally adjustable in the frame members 10 for which purpose the said side bars are carried by extension bars 29 rigid therewith, said extension bars being received in dovetailed grooves 30 in the frame bars 10, set screws 31 being employed to secure the parts in adjusted position. Thus, it will be seen that although the cutter turns constantly in the same plane, for adjustment the workman is enabled to vary the depth of the cut by adjusting the runners 20 relatively to the plane of the cutters and also may quickly adjust the runners laterally with respect to the cutters to suit particular conditions. The runners 20 have suitable handles 32 thereon at both ends for the guiding of the machine by two men.

In the illustrated form both the side frame bars 23 are adjusted laterally but ordinarily it will suffice to have one of the same adjustable, since that will determine the total width of the machine and the distance between the runners 20.

In the form shown in Fig. 6 the machine is essentially the same as in the first construction but is designed to be handled by one man for which purpose it is equipped with a handle 32ª extending from a side of the stator, the handle being hollow for the passage of the compressed air pipe 13ª. In other respects the machine shown in Fig. 6 is like that in the other figures and therefore the same reference characters are employed, the only difference being that the brackets 11 previously referred to are omitted from Fig. 6. The machine of Fig. 6 being small is adapted for more general work than the construction shown in the other figures.

I wish to state in conclusion that although the illustrated example constitutes practical embodiments of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. A machine of the class described, including a frame, a driven shaft in the said frame, a cutter head on the said frame transverse to the axis of rotation of the shaft, side bars on the said frame, means to adjust one of said side bars laterally, runners carried by the said side bars, and means to adjust the said runners on the side bars relatively to the plane of rotation of the cutter head.

2. In a machine of the class described, a frame presenting parallel side bars and parallel transverse bars, a rotary motor between said bars, brackets extending directly from the transverse bars to the motor, additional brackets at the remaining two sides of the motor, and secured at their ends to the said side bars and secured between their ends to the motor, a cutter head on the shaft of the motor, a runner adjacent to each side bar, and means to adjust the runners relatively to the plane of rotation of the cutter head.

3. A machine of the class described, including a frame, a motor driven rotary cutter head on said frame, side bars on said frame, a runner adjacent to each side bar, slotted brackets on said runners, set screws extending through the slots of the brackets and engaging the said side bars, adjusting screws having threaded engagement with said brackets, and members appurtenant to the said side bars and engaged by said adjusting screws whereby to adjust the brackets and runners relatively to the plane of rotation of the cutter head by turning the said adjusting screws.

JAMES W. INGLETON.